United States Patent
Saito et al.

(10) Patent No.: US 10,793,470 B2
(45) Date of Patent: Oct. 6, 2020

(54) OPTICAL FIBER AND METHOD OF MANUFACTURING THE SAME

(71) Applicant: FURUKAWA ELECTRIC CO., LTD., Tokyo (JP)

(72) Inventors: Takeshi Saito, Tokyo (JP); Kenichi Suyama, Tokyo (JP); Yoshihiro Arashitani, Tokyo (JP)

(73) Assignee: FURUKAWA ELECTRIC CO., LTD., Tokyo (JP)

(*) Notice: Subject to any disclaimer, the term of this patent is extended or adjusted under 35 U.S.C. 154(b) by 787 days.

(21) Appl. No.: 14/800,160

(22) Filed: Jul. 15, 2015

(65) Prior Publication Data
US 2015/0315072 A1 Nov. 5, 2015

Related U.S. Application Data

(63) Continuation of application No. PCT/JP2014/000293, filed on Jan. 22, 2014.

(30) Foreign Application Priority Data

Feb. 4, 2013 (JP) .................................. 2013-019537

(51) Int. Cl.
*C03C 25/105* (2018.01)
*C03C 25/40* (2006.01)
(Continued)

(52) U.S. Cl.
CPC ............ *C03C 25/105* (2013.01); *B05D 3/067* (2013.01); *C03C 13/045* (2013.01); *C03C 25/40* (2013.01);
(Continued)

(58) Field of Classification Search
CPC ....... C03C 25/105; C03C 25/40; C03C 25/50; C03C 13/045; B05D 3/067; G02B 1/048; G02B 6/02033; Y10T 428/2962
See application file for complete search history.

(56) References Cited

U.S. PATENT DOCUMENTS 4,317,616 A * 3/1982 Clarke .................. C03C 25/105
385/123
4,457,970 A * 7/1984 Das ........................ C03C 25/26
428/391

(Continued)

FOREIGN PATENT DOCUMENTS

JP 63-287908 11/1988
JP 02-008803 A 1/1990
(Continued)

OTHER PUBLICATIONS

Machine translation of JP 2011-033933 A (Year: 2011).*
(Continued)

*Primary Examiner* — Scott R. Walshon
(74) *Attorney, Agent, or Firm* — Oblon, McClelland, Maier & Neustadt, L.L.P.

(57) ABSTRACT

An optical fiber including a glass core, and a polymer cladding formed around the glass core, the polymer cladding containing a mixture of a polymerizable composition and a silane coupling agent, and a fluorine-based ultraviolet curable resin. The mixture contains 5 to 95 parts by weight of the silane coupling agent based on 100 parts by weight of the total weight of the mixture. The fluorine-based ultraviolet curable resin alone has a refractive index in a range of 1.350 to 1.420 after ultraviolet curing. A component originated from the silane coupling agent is concentrated within a range of 20 μm or less in the polymer cladding from an interface between the glass core and the polymer cladding.

4 Claims, 4 Drawing Sheets

(51) Int. Cl.
*C03C 25/50* (2006.01)
*B05D 3/06* (2006.01)
*G02B 6/02* (2006.01)
*C03C 13/04* (2006.01)
*G02B 1/04* (2006.01)

(52) U.S. Cl.
CPC .............. *C03C 25/50* (2013.01); *G02B 1/048* (2013.01); *G02B 6/02033* (2013.01); *Y10T 428/2962* (2015.01)

(56) References Cited

U.S. PATENT DOCUMENTS

| | | | | |
|---|---|---|---|---|
| 4,804,246 | A | * | 2/1989 | Kobayashi ............ C03C 25/105 385/128 |
| 4,968,116 | A | * | 11/1990 | Hulme-Lowe .......... C03C 13/04 385/145 |
| 5,822,489 | A | | 10/1998 | Hale |
| 8,693,832 | B2 | | 4/2014 | Nakamura et al. |

FOREIGN PATENT DOCUMENTS

| | | |
|---|---|---|
| JP | 2-48434 | 2/1990 |
| JP | 4-198346 | 7/1992 |
| JP | 5-224108 | 9/1993 |
| JP | 9-61643 | 3/1997 |
| JP | 9-222526 | 8/1997 |
| JP | 10-197731 | 7/1998 |
| JP | 2000-34137 | 2/2000 |
| JP | 2000-214342 A | 8/2000 |
| JP | 2011-33933 | 2/2011 |
| JP | 2012-18258 | 1/2012 |
| JP | 2012-42795 | 3/2012 |

OTHER PUBLICATIONS

International Preliminary Report on Patentability dated Aug. 13, 2015 in PCT Application PCT/JP2014/000293, filed on Jan. 22, 2014 (English translation only).

Office Action dated Feb. 20, 2020, in Japanese Patent Application No. 2019-083851, w/English-language Translation.

* cited by examiner

OPTICAL FIBER AND METHOD OF MANUFACTURING THE SAME

CROSS-REFERENCES TO RELATED APPLICATIONS

This application is a continuation application of International Application No. PCT/JP2014/000293, filed Jan. 22, 2014, which claims the benefit of Japanese Patent Application No. 2013-019537, filed Feb. 4, 2013. The contents of the aforementioned applications are incorporated herein by reference in their entireties.

TECHNICAL FIELD

The present invention relates to an optical fiber, and more specifically relates to a polymer clad optical fiber formed using a fluorine-based ultraviolet curable resin with a low refractive index and a method of manufacturing the same.

BACKGROUND ART

In general, a polymer clad optical fiber has a structure in which a resin is formed around a core. The polymer clad optical fiber enables transmission of high density light energy and is used in fields which require transmission of high output light energy from a laser or the like, fields of sensors, and others. For manufacturing such optical fibers, it has been a conventional practice to mix an ultraviolet curable resin with a silane coupling agent to enhance adhesive properties between a glass core and the ultraviolet curable resin.

Patent Document 1 discloses an optical fiber manufacturing method which improves adhesive properties between a UV resin coating layer and a glass fiber. Patent Document 2 discloses that an adhesive force between an adhesive and a coated optical fiber is increased by thinly applying a silane coupling agent to the surface of a glass constituting the optical fiber. Patent Document 3 discloses an optical fiber manufacturing method which improves adhesive properties between a bare optical fiber and a coating layer. Patent Document 4 discloses an optical fiber having excellent fiber strength and transmission properties.

Patent Document 5 discloses a photocurable composition with a low refractive index, which has favorable viscosity and excellent mechanical properties such as toughness in a cured state, and which is easily synthesizable. Patent Document 6 discloses a double clad optical fiber which has favorable mechanical strength even with a single layer coating, and has a large numerical aperture.

CITATION LIST

Patent Document

Patent Document 1: Japanese Patent Application Laid-Open No. H02-48434
Patent Document 2: Japanese Patent Application Laid-Open No. H05-224108
Patent Document 3: Japanese Patent Application Laid-Open No. 2000-34137
Patent Document 4: Japanese Patent Application Laid-Open No. 2011-33933
Patent Document 5: Japanese Patent Application Laid-Open No. H10-197731
Patent Document 6: Japanese Patent Application Laid-Open No. 2012-18258

SUMMARY OF INVENTION

In Patent Document 1, a glass fiber is caused to pass through a vapor atmosphere of a silane coupling agent, whereby a silane coupling agent layer is formed on the surface of the glass fiber, and then an ultraviolet curable resin is coated thereon. In Patent Document 2, a portion of the coating of a multi-core optical fiber in its longitudinal direction is removed, and a silane coupling agent is applied by spray coating to a non-extended part of the exposed glass portion of the coated optical fiber. However, the methods of Patent Documents 1 and 2 need an apparatus for generating and controlling the vapor atmosphere of the silane coupling agent, thereby resulting in an increase in manufacturing costs. In addition, the silane coupling agent per se has poor wettability on the surface of the glass fiber. For this reason, even though the silane coupling agent is turned into vapor, it is difficult to evenly deposit the silane coupling agent on the surface of a glass fiber.

In Patent Document 3, a bare optical fiber is coated with an ultraviolet curable resin with the outer circumference of the bare optical fiber supplied with moisture, which improves the effect of a silane coupling agent mixed in the ultraviolet curable resin. In the method of Patent Document 3, however, a problem of a refractive index arises because the ultraviolet curable resin having a relatively-low refractive index is mixed with the silane coupling agent, and their poor miscibility also poses a problem of aggregation of the silane coupling agent, and a problem of phase separation of the silane coupling agent and the fluorine-based ultraviolet curable resin.

In Patent Document 4, an amount of a silane coupling agent contained in a curable composition containing a fluorine-based ultraviolet curable type resin is adjusted to ensure miscibility of the fluorine-based ultraviolet curable type resin and the silane coupling agent. However, in the method of Patent Document 4, it is difficult to apply the silane coupling agent evenly onto the surface of a core glass.

The poor wettability of the silane coupling agent on the surface of a glass core entails a problem of a difficulty in applying the silane coupling agent evenly to the surface of a glass core. In addition, the mixing of the fluorine-based ultraviolet curable resin with the silane coupling agent causes a problem in that the refractive index of the fluorine-based ultraviolet curable resin is increased due to the influence of the silane coupling agent. Moreover, the miscibility of the fluorine-based ultraviolet curable resin with the low refractive index and the silane coupling agent is so poor that just simple mixing of them has a problem of aggregation of the silane coupling agent and a problem of phase separation of the silane coupling agent and the fluorine-based ultraviolet curable. Hence, in the manufacturing of polymer clad optical fibers, there has been a demand for solution to these problems.

According to an embodiment of the present invention, provided is an optical fiber including a glass core and a polymer cladding formed around the glass core, in which the polymer cladding includes a mixture of a polymerizable composition and a silane coupling agent, and a fluorine-based ultraviolet curable resin, the mixture contains 5 to 95 parts by weight of the silane coupling agent based on 100 parts by weight of a total weight of the mixture, the fluorine-based ultraviolet curable resin alone has a refractive index in a range of 1.350 to 1.420 after ultraviolet curing, and a component originated from the silane coupling agent is concentrated within a range of 20 µm or less in the polymer cladding from an interface between the glass core and the polymer cladding.

In addition, according to an embodiment of the present invention, provided is a method of manufacturing an optical fiber, including the steps of: applying a mixture of a polymerizable composition and a silane coupling agent to a glass core; applying a fluorine-based ultraviolet curable resin onto the mixture; and forming a polymer cladding around the glass core by subjecting the fluorine-based ultraviolet curable resin to a ultraviolet curing process, in which the mixture contains 5 to 95 parts by weight of the silane coupling agent based on 100 parts by weight of a total weight of the mixture, the fluorine-based ultraviolet curable resin alone has a refractive index in a range of 1.350 to 1.420 after ultraviolet curing, and a component originated from the silane coupling agent is concentrated within a range of 20 µm or less in the polymer cladding from an interface between the glass core and the polymer cladding.

According to an embodiment of the present invention, a silane coupling agent can be applied evenly to the surface of a glass core by using a mixture of the silane coupling agent and a polymerizable composition having good wettability on the surface of the glass core. In addition, according to an embodiment of the present invention, after a mixture of a polymerizable composition and a silane coupling agent is applied, a fluorine-based ultraviolet curable resin is applied by wet-on-wet coating onto the applied mixture. This makes it possible to avoid aggregation of the silane coupling agent or phase separation of the silane coupling agent and the fluorine-based ultraviolet curable resin. Further, in an embodiment of the present invention, a component originated from the silane coupling agent is concentrated within a range of 20 µm or less in the polymer cladding from the interface between the glass core and the polymer cladding, which enables reduction in an increase in the refractive index of the fluorine-based ultraviolet curable resin due to an influence of the silane coupling agent.

DESCRIPTION OF EMBODIMENTS

Figure 1A:
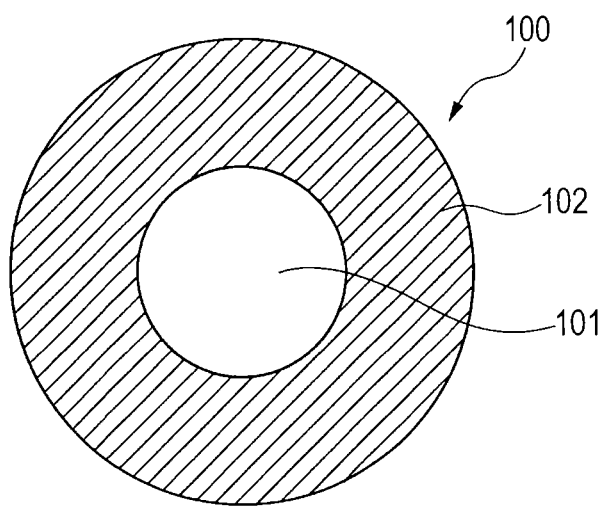
FIG. 1A is a cross sectional view of an optical fiber according to an embodiment of the present invention.

Hereinafter, illustrative embodiments for implementing the present invention are described in details with reference to the drawings. It should be noted that the dimensions, materials, shapes, relative positions of constituent elements, and other things to be mentioned in the following embodiments are optional, and may be changed depending on the structures of apparatuses to which the present invention is applied, and depending on various conditions. In addition, unless otherwise specified, the scope of the present invention should not be limited to aspects described in detail in the following embodiments. Moreover, in the drawings described below, elements having the same function are denoted by the same reference numeral, and some part of the repetitive explanation thereof may be omitted.

(Optical Fiber)

Figure 1B:
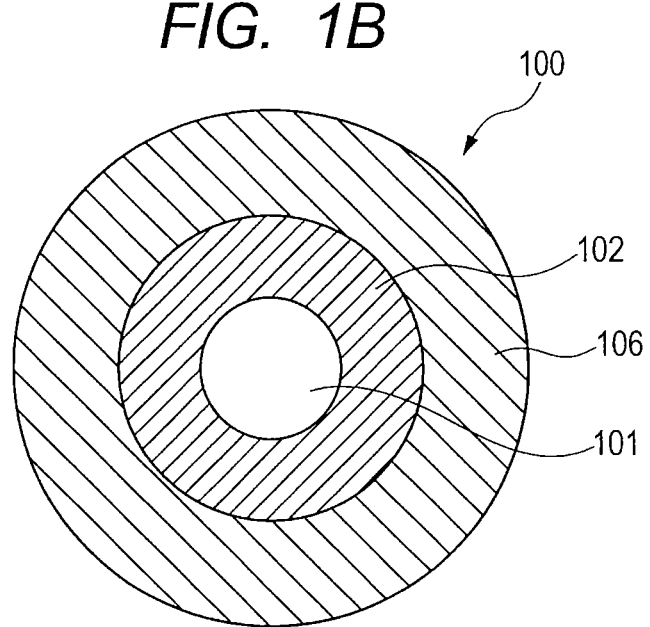
FIG. 1B is a cross sectional view of an optical fiber according to an embodiment of the present invention.

FIG. 1A and FIG. 1B are cross sectional views of optical fibers according to embodiments of the present invention, which are each taken along a direction perpendicular to a longitudinal direction of the optical fiber.

A glass core 101 is formed of a cylindrical quartz glass or the like, and may be added with a substance such as a rare-earth element depending on intended use. In addition, the diameter of the glass core 101 is changed as needed depending on the intended use, and may be 200 µm, or larger, for example.

A polymer cladding 102 is formed using a polymerizable composition (A), a silane coupling agent (B), and a fluorine-based ultraviolet curable resin (C), and has a lower refractive index than the glass core 101 does. The thickness of the polymer cladding 102 is changed as needed depending on the intended use, and may be 25 µm, for example.

The polymerizable composition (A) is a substance having good wettability on the surface of the glass core 101 and having good miscibility with the fluorine-based ultraviolet curable resin (C). For example, the polymerizable composition (A) may be a polymerizable composition containing a fluorinated (meth)acrylate compound. Preferable examples of the fluorinated (meth)acrylate compound include 1H,1H-2,2,3,3,4,4,4-heptafluorobutyl acrylate available from Sigma-Aldrich, Saint Louis, Mo.; 1H,1H,2H,2H-perfluorodecyl acrylate and/or ω-hydro-2,2,3,3,4,4,5,5-octafluoropentyl acrylate both available from Lancaster Synthesis, Windham, N.H.; $C_4F_9SO_2N(CH_3)CH_2CH_2OC(=O)CH=CH_2$ produced in the procedure of Examples 2A and 2B in Description of U.S. Pat. No. 6,664,354; a fluorinated (meth)acrylic compound containing (perfluorocyclohexyl) methyl acrylate, which is described in Descriptions of U.S. Pat. Nos. 4,968,116 and 5,239,026; and the like. Moreover, the polymerizable composition (A) may be perfluorocyclohexylmethyl methacrylate, pentafluorobenzyl (meth)acrylate, pentafluorophenyl (meth)acrylate, perfluoronorbornylmethyl (meth)acrylate, 1H-perfluoroisobornyl acrylate, 2,2,3,3,4,4,5,5-octafluorohexanediol-1,6-diacrylate, perfluorocyclohexyl-1,4-dimethyldiacrylate, polyperfluoroethyleneglycol diacrylate, 2,2,3,3-tetrafluoro-1,4-butanediol diacrylate, hexafluoropentandiyl-1-5 bis (acrylate), hexafluorobisphenol A diacrylate, and the like.

The silane coupling agent (B) is a substance dispersed in the polymerizable composition (A), and improving the adhesive force between the surface of the glass core 101 and the fluorine-based ultraviolet curable resin (C). For example, the silane coupling agent (B) contains, as a reactive functional group, any of an acrylic group, a (meth)acrylic group, an epoxy group, a vinyl group, an amino group, a styryl group, a mercapto group, a ureido group, a sulfide group, an isocyanate group, and the like, and contains, as a hydrolyzable group, a methoxy group ($OCH_3$), an ethoxy group ($OC_2H_5$), an acetoxy group ($OCOCH_3$), or the like. An example of the acrylic group is 3-acryloxypropyltrimethoxysilane. Examples of the (meth)acrylic group include 3-methacryloxypropylmethyldimethoxysilane, 3-methacryloxypropyltrimethoxysilane, 3-methacryloxypropylmethyldiethoxysilane, and 3-methacryloxypropyltriethoxysilane. Examples of the epoxy group include 2-(3,4-epoxycyclohexyl)ethyltrimethoxysilane, 3-glycidoxypropylmethyldimethoxysilane, 3-glycidoxypropyltrimethoxysilane, 3-glycidoxypropylmethyldiethoxysilane, and 3-glycidoxypropyltriethoxysilane. Examples of the vinyl group include vinyltrimethoxysilane, and vinyltriethoxysilane. Examples of the amino group include N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyltriethoxysilane, 3-triethoxysilyl-N-(1,3-dimethyl-butylidene) propylamine, N-phenyl-3-aminopropyltrimethoxysilane, and N-(vinylbenzyl)-2-aminoethyl-3-aminopropyltrimethoxysilane hydrochloride. An example of the styryl group is p-styryltrimethoxysilane. Examples of the mercapto group include 3-mercaptopropylmethyldimethoxysilane, and 3-mercaptopropyltrimethoxysilane. An example of the ureido group is 3-ureidopropyltriethoxysilane. An example of the sulfide group is bis(triethoxysilylpropyl)tetrasulfide. An example of the isocyanate group is 3-isocyanatepropyltriethoxysilane.

The fluorine-based ultraviolet curable resin (C) is an ultraviolet curable resin with a low refractive index, which has good miscibility with the polymerizable composition (A) and contains a relatively large amount of fluorine. In the case of the polymer clad optical fiber generally used for a fiber laser and the like, the fluorine-based ultraviolet curable resin (C) alone, i.e., the fluorine-based ultraviolet curable resin (C) not mixed with the polymerizable composition (A) and the silane coupling agent (B) desirably has a refractive index in a range of 1.350 to 1.420 after ultraviolet-curing. An example of the fluorine-based ultraviolet curable resin (C) is a mixture of components such as an acrylic-based oligomer, urethane acrylate having a perfluoropolyether group, a monofunctional fluorinated acrylate monomer, a bifunctional fluorinated acrylate monomer having a molecular weight of about 400 to 600, perfluoro polyether having two (meth)acrylate functional groups with a molecular weight of less than 1500, and a photopolymerization initiator (for example, DAROCUR™ 1173).

As illustrated in FIG. 1B, a coating layer 106 to serve as a protective layer may be formed outside the polymer cladding 102. The coating layer 106 may contain a usual thermoplastic polymer or ultraviolet curable resin.

(Method of Manufacturing Optical Fiber)

Figure 2A:
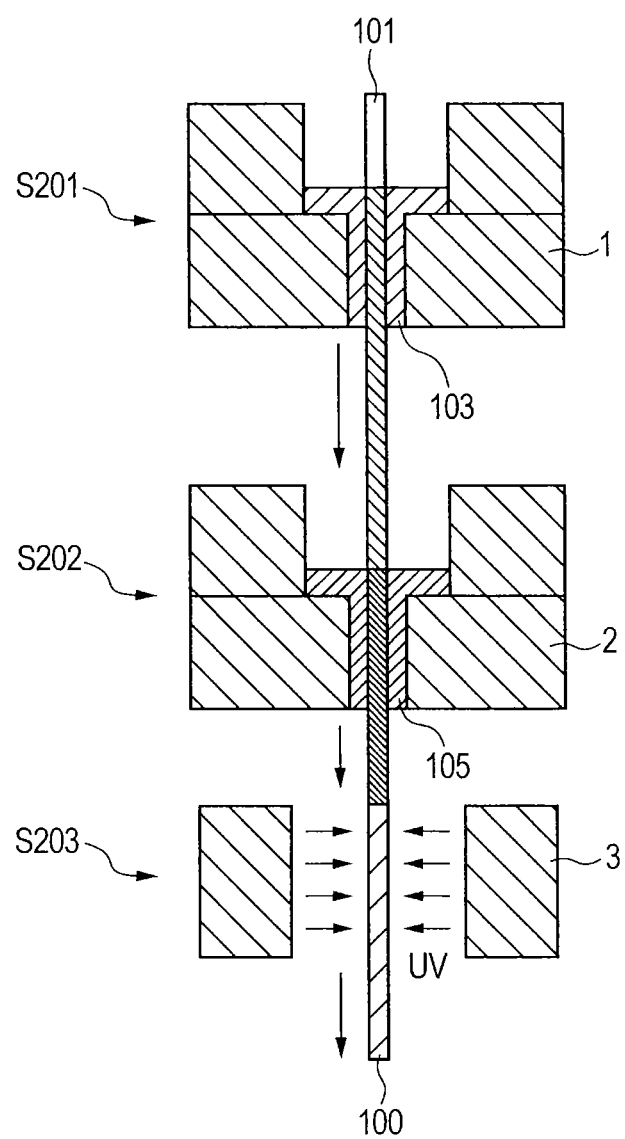
FIG. 2A is a schematic view of apparatuses used in steps of manufacturing an optical fiber according to an embodiment of the present invention.
Figure 2B:
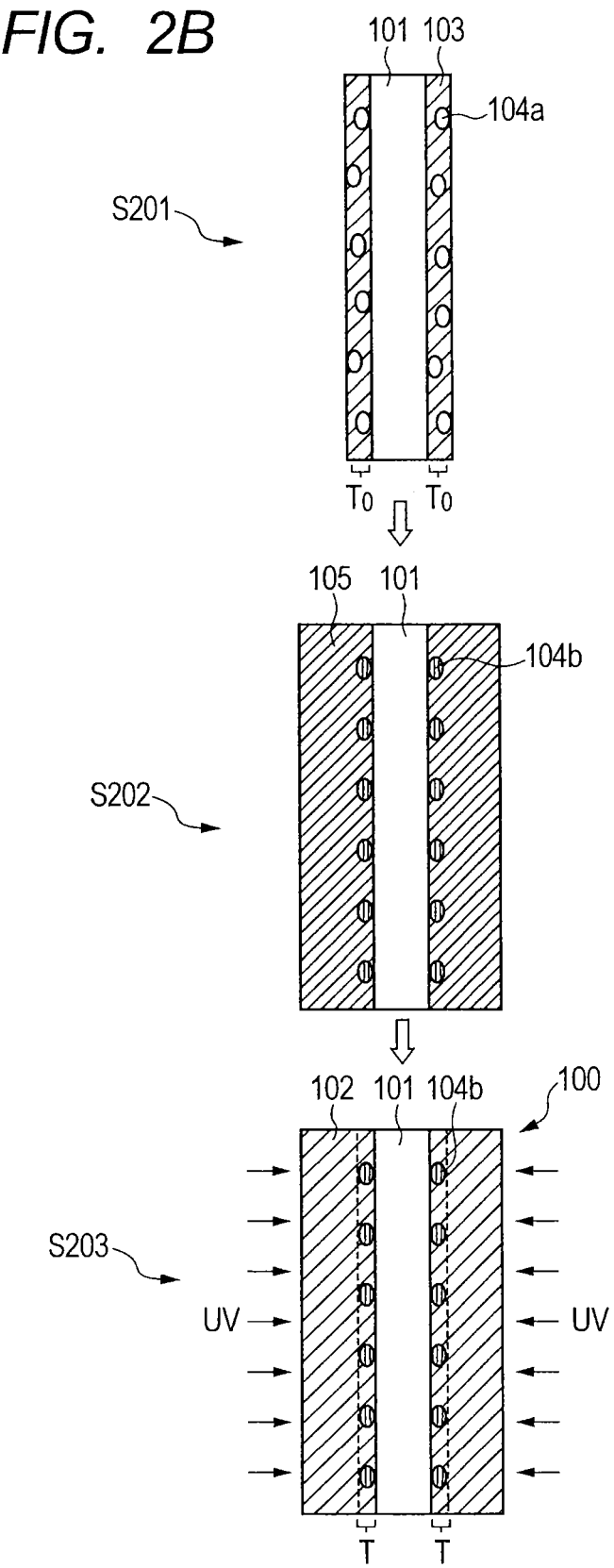
FIG. 2B is a schematic view illustrating cross sections of the optical fiber in the manufacturing steps according to the embodiment of the present invention, the cross sections taken in parallel to a longitudinal direction of the optical fiber.

FIG. 2A is a schematic view of apparatuses used in steps of manufacturing an optical fiber 100 according to an embodiment of the present invention. FIG. 2B is a schematic view illustrating cross sections of the optical fiber 100 in the manufacturing steps, the cross sections taken in parallel to a longitudinal direction of the optical fiber 100.

In Step S201, a drawn glass core 101 is supplied to a first coater apparatus 1. The first coater apparatus 1 is filled with a mixture 103 (also called "a primer") of a polymerizable composition (A) and a silane coupling agent (B) 104a which are mixed together at a predetermined ratio. The first coater apparatus applies the mixture 103 to the circumference of the glass core 101 with a predetermined thickness of $T_0$ while the mixture 103 is kept in a liquid state. The thickness $T_0$ is changed as needed depending on intended use, and may be preferably 20 µm or less, preferably 15 µm or less, and more preferably 10 µm or less.

The silane coupling agent (B) 104a in the mixture 103 is dispersed in the polymerizable composition (A), and the polymerizable composition (A) has good wettability on the surface of the glass core 101. For these reasons, the silane coupling agent (B) 104a in the mixture 103 applied in step S201 evenly exists on the glass core 101.

A second coater apparatus 2 is filled with a fluorine-based ultraviolet curable resin (C) 105 in a liquid state. In step S202, the second coater apparatus 2 applies the fluorine-based ultraviolet curable resin (C) 105 onto the mixture 103 before the mixture 103 in the liquid state is dried. Here, to further apply a liquid substance onto another liquid substance previously applied before the latter liquid substance is dried is referred to as "wet-on-wet" coating. In other words, in step S202, the fluorine-based ultraviolet curable resin (C) 105 is applied by "wet-on-wet" coating onto the mixture 103.

Then, in step S203, an ultraviolet irradiation apparatus 3 including a UV lamp or the like irradiates the fluorine-based ultraviolet curable resin (C) with ultraviolet rays, and thereby cures the fluorine-based ultraviolet curable resin (C). This process is referred to as an "ultraviolet curing process". In this way, the optical fiber 100 in which the polymer cladding 102 is formed around the glass core 101 is manufactured.

Note that, the polymer cladding 102 often and generally has a low modulus of elasticity, and the coating layer 106 to serve as a protective layer may be formed outside the polymer cladding 102 if necessary. In this case, it is preferable that the protective layer be formed of an ultraviolet curable resin from the viewpoint of a manufacturing efficiency. Instead, the protective layer 106 may be formed of a material other than the ultraviolet curable resin such as an extruded coating of a thermoplastic polymer, or another coating layer may be additionally formed outside the protective layer 106 made of the ultraviolet curable resin. The protective layer 106 coated on the outside of the polymer cladding 102 and made of the ultraviolet curable resin may be formed by using, for example, a resin generally used as a secondary for usual optical fibers for communications.

In the optical fiber 100 according to the present embodiment, a component 104b originated from the silane coupling agent is locally concentrated within a predetermined range T in the polymer cladding 102 from an interface between the glass core 101 and the polymer cladding 102. The component 104b originated from the silane coupling agent is a substance in which the silane coupling agent (B) 104a and the fluorine-based ultraviolet curable resin (C) 105 are bonded together after reacting with each other.

The predetermined range T is changed as needed depending on the intended use, and is 20 µm or less, preferably 15 µm or less, and more preferably 10 µm or less. The predetermined range T can be adjusted in step S201 by adjusting the thickness $T_0$ of the mixture 103 when applying the mixture 103 to the glass core 101, and in step S203 by subjecting the fluorine-based ultraviolet curable resin (C) 105 to the ultraviolet curing process before the silane coupling agent (B) contained in the mixture 103 is dispersed to the overall area of the fluorine-based ultraviolet curable resin (C) 105.

For example, the thickness $T_0$ of the mixture 103 applied to the glass core 101 is adjusted to approximately 10 µm or less in step S201, and the fluorine-based ultraviolet curable resin (C) 105 is subjected to the ultraviolet curing process within a predetermined time period in step S203 after the fluorine-based ultraviolet curable resin (C) 105 is applied. Thereby, the component 104b originated from the silane coupling agent (B) can be concentrated within a range of 20 µm or less, preferably 15 µm or less, and more preferably 10 µm or less in the polymer cladding 102 from the interface between the glass core 101 and the polymer cladding 102.

Note that the predetermined time period mentioned above is determined depending on a substance used, and is obtained empirically.

According to the foregoing manufacturing method, the use of the mixture 103 of the polymerizable composition (A) and the silane coupling agent (B) makes it possible to apply the silane coupling agent (B) evenly to the surface of the glass core 101. In addition, improvement in the coating properties of the mixture of the polymerizable composition (A) and the silane coupling agent (B) advantageously increases material choices for the fluorine-based ultraviolet curable resin (C). Moreover, the component 104b originated from the silane coupling agent can be locally concentrated near the interface between the glass core 101 and the polymer cladding 102, i.e., within the predetermined range T in the polymer cladding 102 from the interface between the glass core 101 and the polymer cladding 102. This enables enhancement of an adhesive force between the glass core 101 and the polymer cladding 102, and reduction of an influence in which the refractive index of the polymer cladding 102 is increased by the component 104b originated from the silane coupling agent.

EXAMPLES

Hereinafter, Examples of the present invention are described. In Examples, a ratio between the polymerizable composition (A) and the silane coupling agent (B) were varied variously while a ratio of the fluorine-based ultraviolet curable resin (C) was kept constant, and the following items were examined: an adhesive force between a glass core and a polymer cladding formed around the glass core; and a miscibility, coating properties, and a refractive index of a mixture of the polymerizable composition (A) and the silane coupling agent (B).

In Examples, a glass plate made of the same substance as the glass core (quartz in Examples presented herein) was used in order to make it easier to check the coating properties of the mixture and to measure the adhesive force of the mixture to the glass. Samples 1 to 8 each including a resin layer (equivalent to the polymer cladding) on a glass plate (equivalent to the glass core) were fabricated by: applying the mixture of the polymerizable composition (A) and the silane coupling agent (B) onto the glass plate by a spin coater or the like; and then applying the fluorine-based ultraviolet curable resin (C) by wet-on-wet coating onto the applied mixture by the spin coater or the like, followed by the ultraviolet curing process.

Moreover, fibers were manufactured by using the compositions and combinations of Samples 1 to 8. The fibers were each manufactured by forming a mixture layer+a polymer cladding layer around a silica core fiber having an outer diameter of 200 μm, so that the outer diameter of the resultant fiber was 300 μm. Transmission losses in each fiber at 850 nm when 24 to 36 hours elapsed after the manufacturing were measured by an OTDR. Thereafter, the transmission losses after 24-hour aging in a pressured thermostatic bath at 100° C. and 100% RH were measured by the OTDR. Thus, increases in terms of the transmission loss before and after the aging were checked. In following Table 1, items "Initial loss (dB/km)" and "Loss after 24 hrs at 100° C. and 100% RH (dB/km)" present the results.

Table 1 presents the fabricated samples of Examples (Samples 1 to 5) and Comparative Examples (Samples 6 to 8). Note that, if the ratio of substances used is the same, a sample even in the form of a fiber can be expected to bring about the same results as in data of Table 1.

To obtain the data of Table 1, used were a glass plate made of quartz, perfluorocyclohexylmethyl methacrylate as the polymerizable composition (A), 3-acryloxypropyltrimethoxysilane as the silane coupling agent (B), and a mixture of a fluorine-rich acrylic oligomer, a photopolymerization initiator, and the like as the fluorine-based ultraviolet curable resin (C). The fluorine-based ultraviolet curable resin (C) alone had a refractive index of about 1.38 after ultraviolet curing.

TABLE 1

|  | Example | | | | | Comparative Example | | |
| --- | --- | --- | --- | --- | --- | --- | --- | --- |
|  | Sample 1 | Sample 2 | Sample 3 | Sample 4 | Sample 5 | Sample 6 | Sample 7 | Sample 8 |
| Polymerizable composition (A) | 1.8 | 1.5 | 1.2 | 1 | 0.5 | 2 | 0.2 | 0 |
| Silane coupling agent (B) | 0.2 | 0.5 | 0.8 | 1 | 1.5 | 0 | 1.8 | 2 |
| Fluorine-based ultraviolet curable resin (C) | 100 | 100 | 100 | 100 | 100 | 100 | 100 | 100 |
| Adhesive force | 20 | 42 | 41 | 47 | 50 | 6 | 40 | 38 |
| (B)/{(A) + (B)} | 10 | 25 | 40 | 50 | 75 | 0 | 90 | 100 |
| Refractive index of mixture of (A) and (B) | 1.373 | 1.382 | 1.392 | 1.397 | 1.418 | 1.37 | 1.425 | 1.427 |
| Miscibility of (A) and (B) | ○ | ○ | ○ | ○ | ○ | — | ○ | — |
| Coating properties of mixture of (A) and (B) | ○ | ○ | ○ | ○ | ○ | ○ | x | x |
| Initial loss (dB/km) | 4.2 | 3.8 | 4 | 3.6 | 3.5 | 4.5 | 6.5 | 6.2 |
| Loss after 24 hrs at 100° C. and 100% RH (dB/km) | 3.8 | 4.5 | 4.1 | 4.2 | 3.9 | 10.2 | 7.7 | 5.8 |

In Table 1, the unit for (A), (B) and (C) is "parts by weight", and the unit for the adhesive force is "N/mm$^2$". The adhesive force was obtained by: applying the mixture of (A) and (B) onto a washed glass plate by the spin coater or the like; further applying (C) by wet-on-wet coating thereon with a fixed thickness (for example, 100 μm); performing the ultraviolet curing process (irradiation conditions: 1500 mW, 1000 mJ) by a UV lamp; cutting the resultant plate into a piece with a certain width; and measuring a peel force at 90° of the cut piece by using a Tensilon universal testing machine or the like.

Then, the unit for (B)/{(A)+(B)} is "%". The refractive index of the mixture of (A) and (B) was measured by using a sodium lamp with a wavelength of 589 nm as a light source, and using an Abbe refractometer at a temperature of 25° C. As for the miscibility of (A) and (B), the (A) and (B) were mixed in a glass container and then were allowed to stand for 24 hours. If the (A) and (B) were not separated into two layers, the miscibility was determined as "0". As for the coating properties of the mixture of (A) and (B), the mixture of (A) and (B) was applied on a washed glass plate by the spin coater, and the coating properties were determined as "○" if the mixture was evenly applied, or determined as "×" if the glass plate repelled the mixture and consequently remained partly uncoated.

Sample 1 was fabricated by applying a mixture of 1.8 parts by weight of the polymerizable composition (A) and 0.2 parts by weight of the silane coupling agent (B) to a glass plate, and then applying 100 parts by weight of the fluorine-based ultraviolet curable resin (C) by wet-on-wet coating thereto, followed by the ultraviolet curing process.

In order to examine the adhesive force between the glass plate (equivalent to the glass core) and the resin layer (equivalent to the polymer cladding) in Sample 1, Sample 1 was cut into a piece with a certain width, and a peel force at 90° was measured by using the Tensilon universal testing machine. As a result, the adhesive force was 20 N/mm².

In order to examine the refractive index of the mixture of the polymerizable composition (A) and the silane coupling agent (B) used to fabricate Sample 1, the refractive index was measured by using the sodium lamp with a wavelength of 589 nm as a light source, and using the Abbe refractometer at a temperature of 25° C. As a result, the refractive index was 1.373. In addition, in order to examine the miscibility of the mixture, the mixture was allowed to stand for 24 hours after the mixing. As a result, the polymerizable composition (A) and the silane coupling agent (B) in the mixture were not separated into two layers ("○"). Moreover, to examine the coating properties of the mixture, the mixture was applied to the washed glass plate by the spin coater. As a result, the mixture was evenly applied to the glass plate ("○").

In the same manner as Sample 1, Samples 2 to 8 were measured in the adhesive force and the others while the parts by weight of the polymerizable composition (A) and the parts by weight of the silane coupling agent (B) were variously changed as in the data of Table 1.

Figure 3:
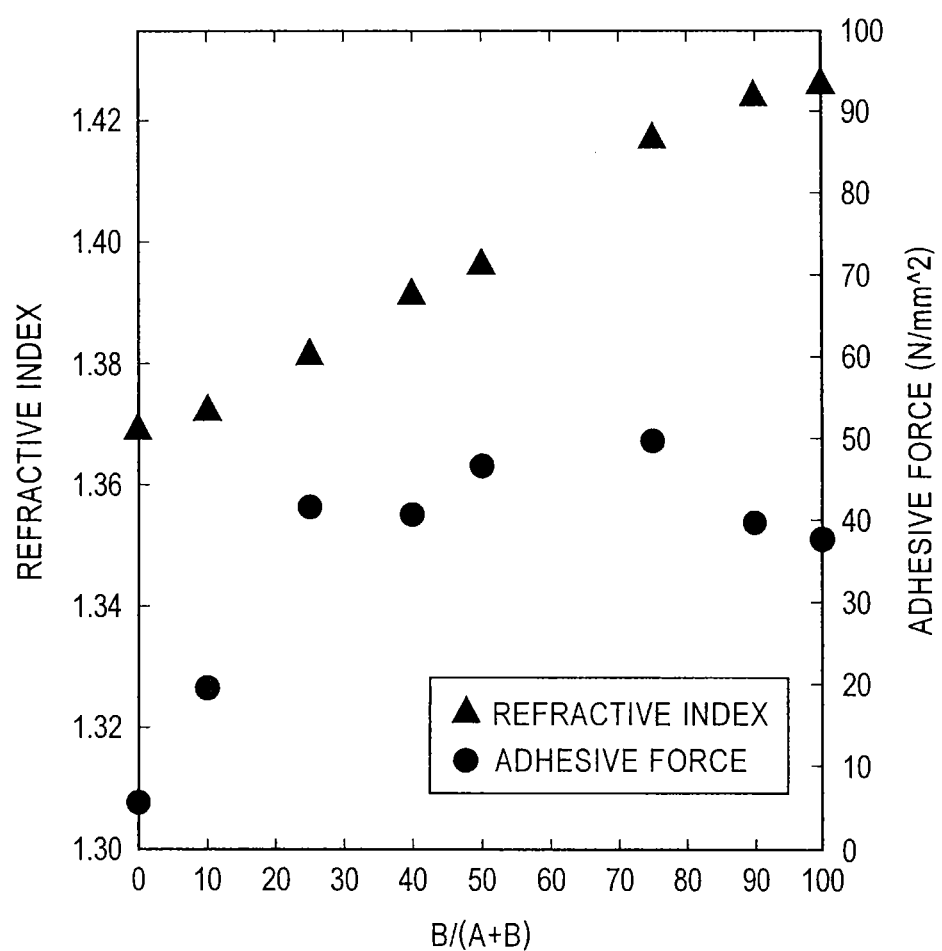
FIG. 3 is a plot diagram illustrating a relationship of a refractive index, an adhesive force, and so forth presented in Table 1.

FIG. 3 is a plot diagram illustrating a relationship between the ratio "(B)/{(A)+(B)}" of the silane coupling agent (B) to the mixture, and each of the refractive index and the adhesive force, presented in Table 1. As the ratio of the silane coupling agent (B) to the mixture of the polymerizable composition (A) and the silane coupling agent (B) increases, the refractive index increases, whereas the adhesive force increases and then decreases gently.

In addition, as a result of comparison between the transmission losses of the manufactured optical fiber before and after the aging, no increase in the losses before and after the aging was observed in Examples 1 to 5, whereas an increase in the loss after the aging was observed in Comparative Example 1. In addition, in Comparative Examples 2 and 3, even though a significant increase was not observed, the initial loss (before the aging) was unfavorably high due to an uneven formation of the mixture layer or the silane coupling agent layer.

In the case of a polymer clad optical fiber for use for a fiber laser or the like, it is desirable that the refractive index after ultraviolet curing of the fluorine-based ultraviolet curable resin (C) alone be within a range of 1.350 to 1.420. For this reason, it is also desirable that the refractive index of the mixture of the polymerizable composition (A) and the silane coupling agent (B) be within the same range and be low in order to reduce the influence on the refractive index of the fluorine-based ultraviolet curable resin (C). Hence, in order to reduce the influence of the mixture containing the silane coupling agent (B) over the refractive index of the fluorine-based ultraviolet curable resin (C) while keeping the adhesive force, the ratio of the silane coupling agent to the mixture is desirably 10 to 80%, more desirably 10 to 50%, and even more desirably 20 to 40%.

The above Examples of the present invention have been presented as examples, and are not intended to limit the scope of the invention. The present invention can be implemented in various other ways, and various ways of omission, substitution, or modification can be made without departing from the spirit of the invention.

The invention claimed is:

1. An optical fiber comprising:

a glass core; and a cured polymer cladding formed around the glass core, the polymer cladding having a thickness of (1) no less than 25 μm and (2) 100 μm or less before curing, wherein the polymer cladding is formed from a mixture of a polymerizable composition and a silane coupling agent, and a fluorine-based ultraviolet curable resin, the mixture contains more than 25 to 95 parts by weight of the silane coupling agent based on 100 parts by weight of a total weight of the mixture, the fluorine-based ultraviolet curable resin alone has a refractive index in a range of 1.350 to 1.420 after ultraviolet curing, and a component formed from the silane coupling agent is discretely concentrated within a range of 20 μm or less in the polymer cladding from an interface between the glass core and the polymer cladding.

2. The optical fiber according to claim 1, wherein a ratio of the silane coupling agent to the mixture of the polymerizable composition and the silane coupling agent is in the range of from more than 25% to 80%.

3. The optical fiber according to claim 1, wherein a ratio of the silane coupling agent to the mixture of the polymerizable composition and the silane coupling agent is in the range of from more than 25% to 50%.

4. The optical fiber according to claim 1, wherein a ratio of the silane coupling agent to the mixture of the polymerizable composition and the silane coupling agent is in the range of from more than 25% to 40%.

* * * * *